United States Patent
Kinoshita

(10) Patent No.: US 9,759,921 B2
(45) Date of Patent: Sep. 12, 2017

(54) IMAGE DISPLAY APPARATUS HAVING ADJUSTABLE IMAGE DISPLAY UNITS

(71) Applicant: Seiko Epson Corporation, Tokyo (JP)

(72) Inventor: Satoshi Kinoshita, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 182 days.

(21) Appl. No.: 14/688,142

(22) Filed: Apr. 16, 2015

(65) Prior Publication Data

US 2015/0323792 A1    Nov. 12, 2015

(30) Foreign Application Priority Data

May 7, 2014   (JP) ................................ 2014-095731

(51) Int. Cl.
*G06F 3/01*      (2006.01)
*G02B 27/01*     (2006.01)

(52) U.S. Cl.
CPC ....... *G02B 27/0172* (2013.01); *G02B 27/017* (2013.01); *G02B 27/0176* (2013.01); *G02B 2027/0158* (2013.01); *G02B 2027/0178* (2013.01)

(58) Field of Classification Search
CPC ..... G02B 27/0093; G02B 27/01; G06T 11/00; G06T 19/006; G06T 7/00; G06F 3/011; G10H 1/00; G05B 2219/35482; G05B 2219/39449–2219/39451; G05B 2219/40131; A61B 2090/365; A61B 1/00193–1/00197; A61B 3/08–3/085; G06K 9/00671; H04N 13/0468; H04N 13/042–13/0452; H04N 2213/00–2213/008; H04N 5/2251–5/2254; H04N 5/247; H04N 13/00
See application file for complete search history.

(56) References Cited

U.S. PATENT DOCUMENTS

2005/0174470 A1*  8/2005  Yamasaki ............ G02B 27/017
                                                    348/345
2007/0057867 A1   3/2007  Mizuuchi et al.
(Continued)

FOREIGN PATENT DOCUMENTS

| JP | 06-276459 A | 9/1994 |
| JP | 07-115607 A | 5/1995 |
| JP | 2000-249967 A | 9/2000 |

(Continued)

*Primary Examiner* — Sanghyuk Park
(74) *Attorney, Agent, or Firm* — ALG Intellectual Property, LLC

(57) ABSTRACT

A display device according to an embodiment of the invention includes an image display unit for the left eye, an image display unit for the right eye, a main frame which supports the image display unit for the left eye and the image display unit for the right eye, and a position adjusting unit which adjusts positions of the image display unit for the left eye and the image display unit for the right eye with respect to the main frame. The position adjusting unit adjusts a gap between the image display unit for the left eye and the image display unit for the right eye, and respectively adjusts a position of the image display unit for the left eye with respect to the main frame, and a position of the image display unit for the right eye with respect to the main frame independently.

12 Claims, 10 Drawing Sheets

(56) References Cited

U.S. PATENT DOCUMENTS

2012/0162764 A1    6/2012  Shimizu
2013/0038510 A1*   2/2013  Brin .................... G02B 27/017
                                                            345/8

FOREIGN PATENT DOCUMENTS

| JP | 2002-182148 A | 6/2002 |
| JP | 2007-081984 A | 3/2007 |
| JP | 2012-138654 A | 7/2012 |
| JP | 2013-211811 A | 10/2013 |

* cited by examiner

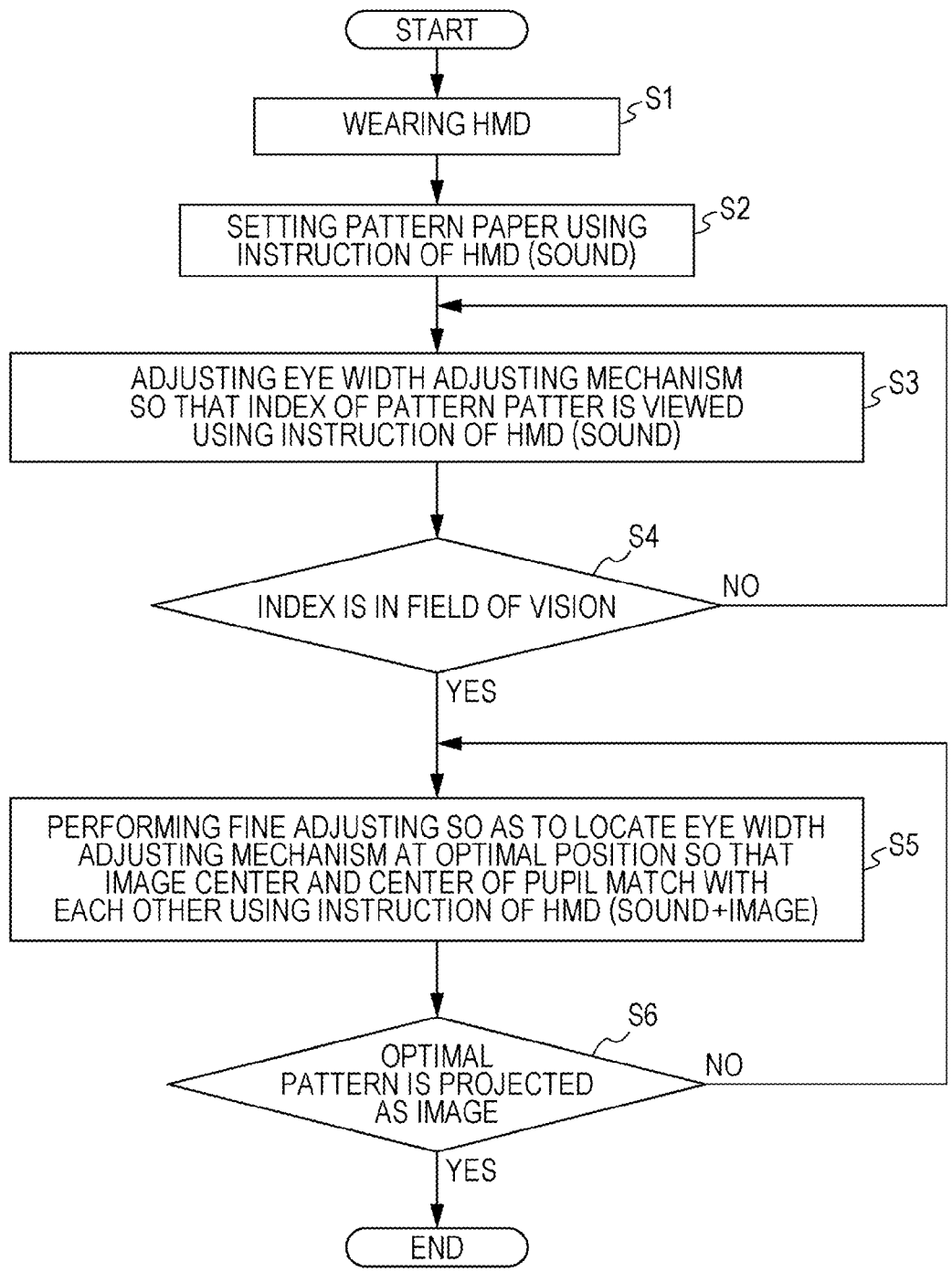

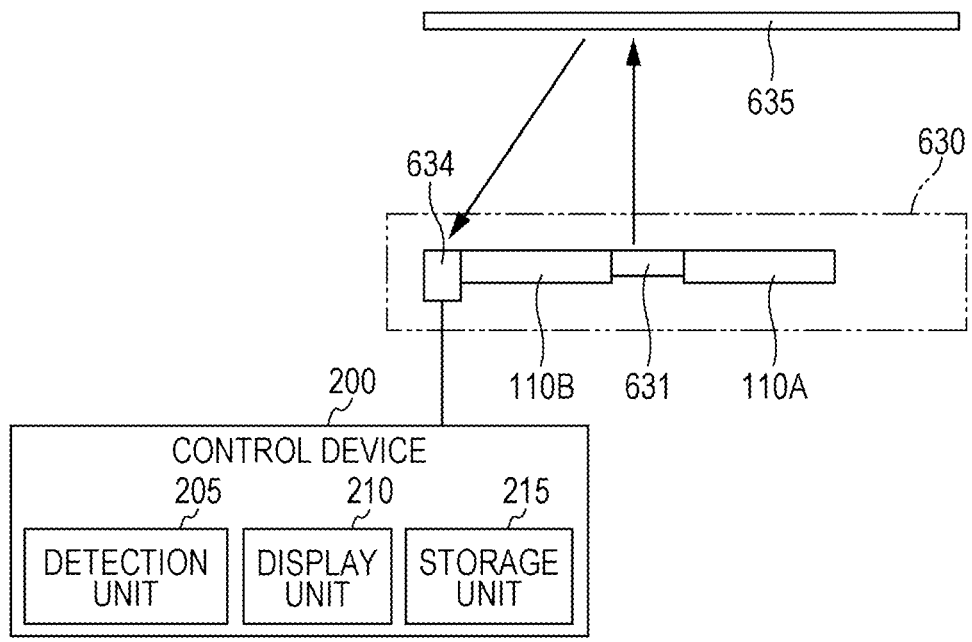
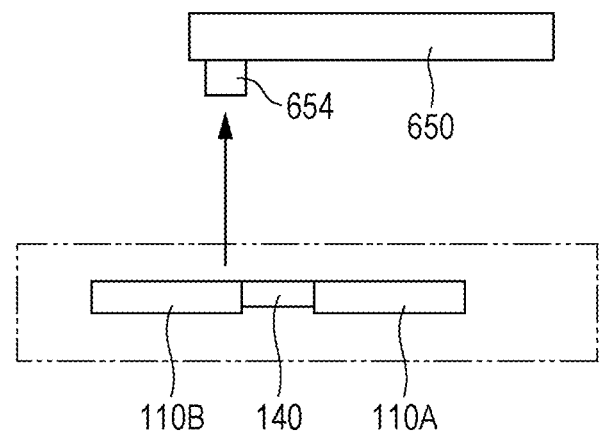

IMAGE DISPLAY APPARATUS HAVING ADJUSTABLE IMAGE DISPLAY UNITS

BACKGROUND

1. Technical Field

The present invention relates to an image display apparatus.

2. Related Art

In recent years, an image display apparatus such as a head mounted display as a wearable information device has been provided. For example, in JP-A-2002-182148, a head mounted image display apparatus which includes a pair of prism elements which guides an image to the eyes of a viewer, a plurality of contact units which regulate positions of the pair of prism elements, and an urging member which provides an urging force for pressing the contact units is provided.

In JP-A-2007-81984, a head mounted display which includes an eye width adjusting mechanism in which a display unit for the left eye and a display unit for the right eye move right and left, symmetrically, about a rotation axis along a guide unit is disclosed. In JP-A-2013-211811, a frame for head mounted device which can change the amount of tilt of a pair of nose pads on the right and left sides, independently, is disclosed.

In an image display apparatus such as a head mounted display, it is necessary to perform a position adjusting operation of image display units on the right and left so that an image is in the field of vision of a user in order for the user to view the image. However, in the above described apparatuses in JP-A-2002-182148, JP-A-2007-81984, and JP-A-2013-211811, there has been a problem in that it is difficult to perform a position adjusting operation of the image display unit.

In the image display apparatus such as the head mounted display, miniaturization and weight reduction of the apparatus are necessary in order to obtain a comfortable feeling when worn. For this reason, development of an apparatus is occurring with the intent of making the size of an image in the eyes, a so-called diameter of an exit pupil, small. However, when the diameter of the exit pupil is small, the position of an image which is initially set easily deviates from the field of vision, and it is difficult to make the position of the image align in the field of vision of a user. In this manner, when the diameter of the exit pupil becomes small, a problem in the above described position adjusting operation becomes significant.

SUMMARY

An advantage of some aspects of the invention is to provide an image display apparatus in which a position adjusting operation of an image display unit can be easily performed.

According to an aspect of the invention, there is provided an image display apparatus which includes a first image display unit; a second image display unit; a support member which supports the first image display unit and the second image display unit; and a position adjusting unit which adjusts positions of the first image display unit and the second image display unit, in which the position adjusting unit adjusts a gap between the first image display unit and the second image display unit, and adjusts the position of the first image display unit with respect to the support member, and the position of the second image display unit with respect to the support member, respectively and independently.

In general, the right and the left eyes of a human are not at completely symmetric positions with respect to the center of the face, for example, the center of the nose, in many cases. For this reason, for example, when the right and left image display units are symmetrically arranged with respect to the center of the nose by adjusting a gap between the right and left image display units, it is difficult to align the position of an image at the center of the field of vision of a user. In contrast to this, in the image display apparatus according to the aspect of the invention, it is possible for the position adjusting unit to adjust the gap between the first image display unit and the second image display unit, and to adjust the position of the first image display unit with respect to the support member, and the position of the second image display unit with respect to the support member, respectively and independently. In this manner, it is possible for a user to easily perform the work of adjusting the position of the image display unit so that an image is located at the center of the field of vision.

In the image display apparatus, the position adjusting unit may include a connection member which adjusts a gap between the first image display unit and the second image display unit, and connects the first image display unit and the second image display unit; a first elastic member which is arranged between the support member and the first image display unit, and is formed of an elastic material; and a second elastic member which is arranged between the support member and the second image display unit, and is formed of an elastic material.

According to the configuration, it is possible to adjust the gap between the first image display unit and the second image display unit using the connection member, and to adjust positions of the first image display unit and the second image display unit, respectively, using the first elastic member and the second elastic member.

In the image display apparatus, the connection member may be configured of an elastic material.

According to the configuration, it is possible to apply a force which works in the width direction and widens the gap between the first image display unit and the second image display unit, or in the width direction and narrows the gap between the first image display unit and the second image display unit using the connection member which is formed of the elastic material.

The image display apparatus may further include a deformation adjusting member which adjusts a deformation amount of the connection member.

According to the configuration, it is possible to accurately perform a position adjusting operation of the image display unit when a user adjusts the deformation amount of the connection member by operating the deformation adjusting member.

In the image display apparatus, an elastic modulus of the first elastic member may be an elastic modulus which is different from that of the second elastic member.

According to the configuration, it is possible to make a movement amount of the first image display unit and a movement amount of the second image display unit different when adjusting the gap between the first image display unit and the second image display unit, due to the elastic moduli of the first elastic member and the second elastic member which are different from each other.

The image display apparatus may further include an elastic force adjusting unit which adjusts at least one of an elastic force of the first elastic member and an elastic force of the second elastic member.

According to the configuration, it is possible to make the movement amount of the first image display unit and the movement amount of the second image display unit different when adjusting the gap between the first image display unit and the second image display unit, by adjusting at least one of the elastic force of the first elastic member and the elastic force of the second elastic member using the elastic force adjusting unit.

In the image display apparatus, the first image display unit and the second image display unit may be see-through-type display units respectively each of which displays image light and natural light in an overlapping manner.

According to the configuration, since the first image display unit and the second image display unit are see-through-type display units, respectively, it is possible for a user to view an image, and to view the outside, as well. In this manner, it is possible for a user to perform a position adjusting operation of the image display unit using an external device which can image the user, a mirror, or the like.

The image display apparatus may further include a first index unit which has a first index denoting an image position in the first image display unit, and a second index unit which has a second index denoting an image position in the second image display unit.

According to the configuration, since a user can use the first index unit and the second index unit as standards when adjusting positions, it is possible to perform a position adjusting operation without displaying an actual image.

In the image display apparatus, the first index unit may be connected to the first image display unit in an overlapping manner through a first attaching-detaching unit, and the second index unit may be connected to the second image display unit in an overlapping manner through the first attaching-detaching unit.

According to the configuration, it is possible to connect each index unit to each image display unit through each attaching-detaching unit when performing a position adjusting operation of each image display unit, and to detach each index unit from each image display unit after finishing the position adjusting operation. For this reason, each index unit does not become an obstacle when a user views an image.

The image display apparatus may further include an imaging unit which images the first index, the second index, and a pupil; a detection unit which detects information on a deviation direction and a deviation amount in positions of the first index and the pupil, and information regarding a deviation direction and a deviation amount in positions of the second index and the pupil based on an imaging result of the imaging unit; and an output unit which outputs the information which is detected using the detection unit.

According to the configuration, the detection unit detects information related to the deviation direction and the deviation amount in positions of the first index and the pupil, and to the deviation direction and the deviation amount in positions of the second index and the pupil based on an imaging result of the imaging unit, and output unit outputs the information. For this reason, it is possible for a user to accurately perform a position adjusting operation of each image display unit by obtaining the information.

The image display apparatus may further include a reception unit which receives information on a deviation direction and a deviation amount in positions of the first index and a pupil, and information regarding a deviation direction and the deviation amount in positions of the second index and the pupil which are transmitted from an external device; and an output unit which outputs the information received by the reception unit.

According to the configuration, the reception unit receives the information on the deviation direction and the deviation amount in positions of the first index and the pupil, and information regarding the deviation direction and the deviation amount in positions of the second index and the pupil which are transmitted from the external device, and output unit outputs the information. For this reason, it is possible for a user to accurately perform the position adjusting operation of each image display unit by obtaining the information.

BRIEF DESCRIPTION OF THE DRAWINGS

The invention will be described with reference to the accompanying drawings, wherein like numbers reference like elements.

FIG. 12 is a flowchart which illustrates a procedure of a position adjusting operation of an image display unit.

FIG. 13 is a plan view of an image display apparatus according to an eighth embodiment.

FIG. 14 is a plan view of an image display apparatus according to a ninth embodiment.

DESCRIPTION OF EXEMPLARY EMBODIMENTS

First Embodiment

Hereinafter, a first embodiment of the invention will be described with reference to FIGS. 1 to 5.

An image display apparatus according to the first embodiment is an example of a head mounted display which is used by a user by being worn on the head.

In the following descriptions, a head mounted display will be abbreviated as HMD.

Figure 1:
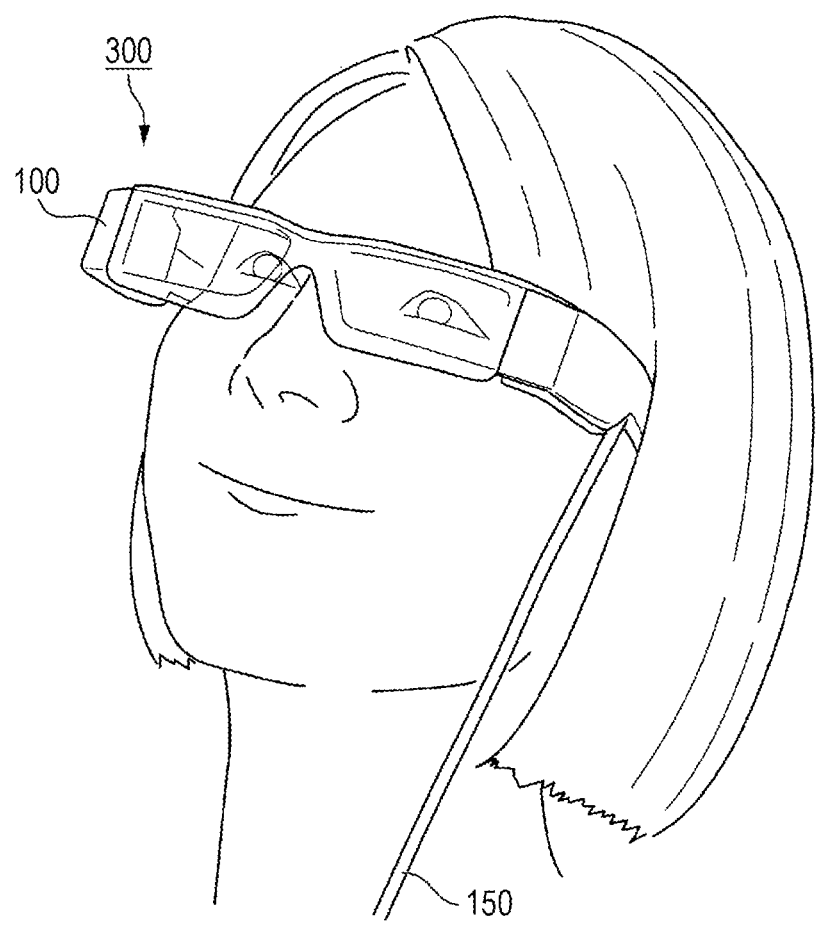
FIG. 1 is a diagram which illustrates a state in which a user wears an image display apparatus according to a first embodiment of the invention.

FIG. 1 is a diagram which illustrates a state in which a user wears the image display apparatus according to the first embodiment.

Figure 2:
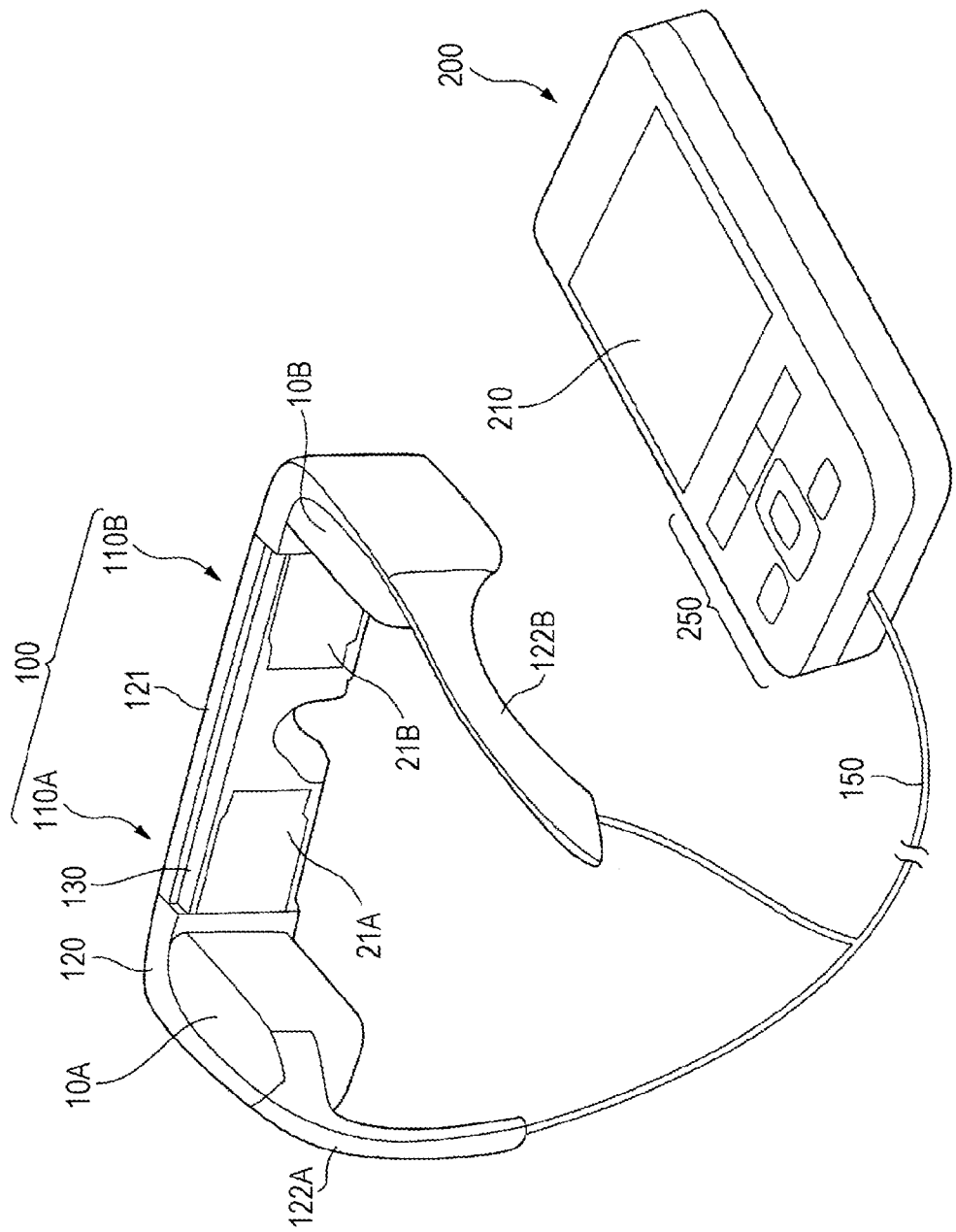
FIG. 2 is a perspective view of the image display apparatus according to the first embodiment.

FIG. 2 is a perspective view of the image display apparatus according to the first embodiment.

In addition, in all of drawings below, there is a case in which reduced scales of dimensions are differently denoted depending on a constituent element, in order to make each constituent element be easily viewed.

As illustrated in FIG. 1, an HMD 300 according to the embodiment is a device which is used by being worn on the head including a sensation of wearing glasses which is felt by a user. The HMD 300 according to the embodiment is a see-through-type (transmission type) HMD. According to the HMD 300 in the embodiment, it is possible for a user to view an image which is generated by an image display unit, and to view scenery outside, as well.

As illustrated in FIG. 2, the HMD 300 includes a display device 100 in a shape which is similar to glasses, and a control device (controller) 200 of a size which can be carried by hand by a user. The display device 100 and the control device 200 are connected so as to communicate with each other in a wired, or a wireless manner.

According to the embodiment, each of an image display unit for the left eye 110A and an image display unit for the right eye 110B which configure the display device 100, and the control device 200 are connected so as to communicate with each other through a cable 150, and transmits an image signal or a control signal.

The "image display unit for the left eye 110A" according to the embodiment corresponds to a "first image display unit" in claims. The "image display unit for the right eye 110B" according to the embodiment corresponds to a "second image display unit" in claims.

The display device 100 includes a main frame 120, a sub-frame 130, an image forming unit for the left eye 10A, the image display unit for the left eye 110A, an image forming unit for the right eye 10B, and the image display unit for the right eye 110B. The control device 200 includes a display unit 210, and an operation button unit 250. The display unit 210 displays, for example, information, an instruction, or the like, which is provided to a user.

The main frame 120 includes a rim unit 121, and a pair of temple units 122A and 122B to be put on the ears of the user. The sub-frame 130 is a member for supporting the image display unit for the left eye 110A and the image display unit for the right eye 110B. The sub-frame 130 is configured so as to move in the longitudinal direction of the rim unit 121 with respect to the main frame 120.

The main frame 120 according to the embodiment corresponds to a support member in claims.

Figure 3:
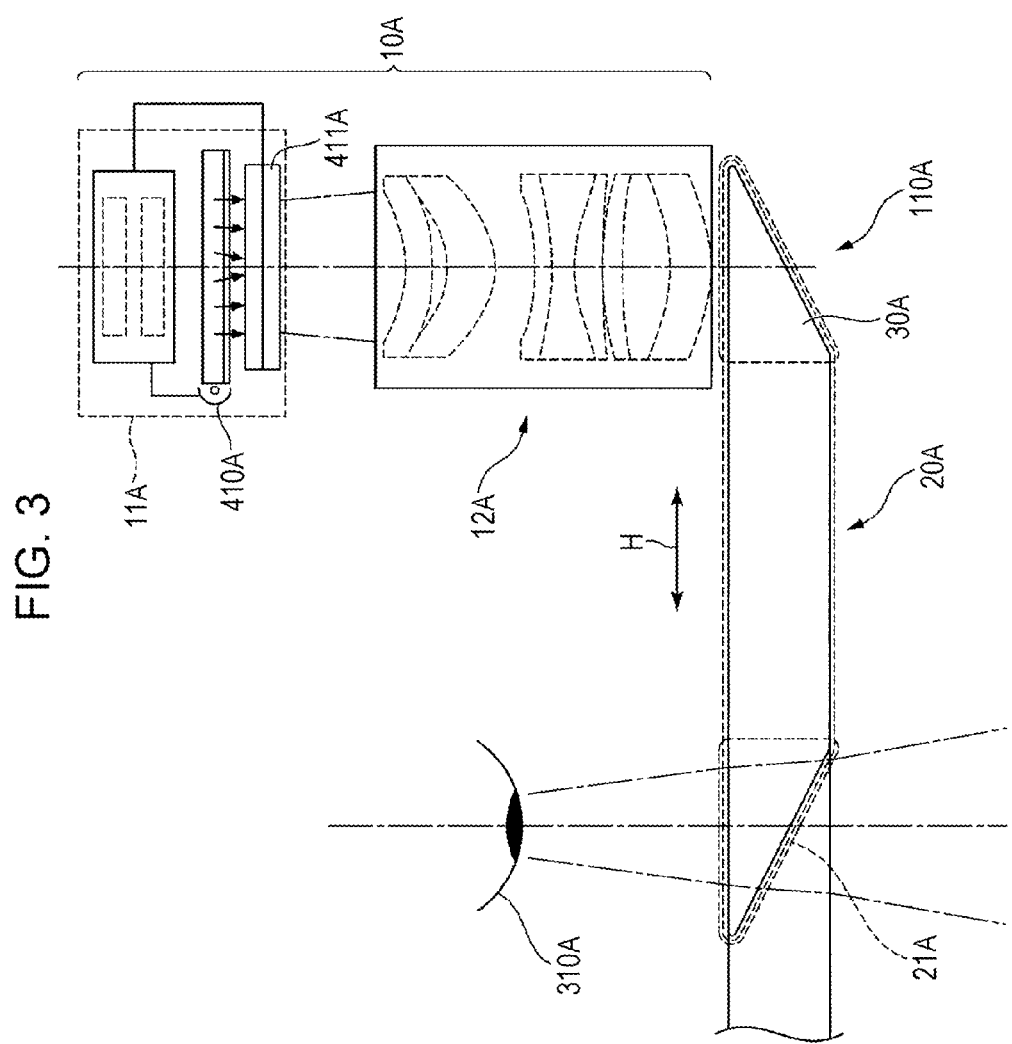
FIG. 3 is a plan view which illustrates a configuration of one image display unit of the image display apparatus according to the first embodiment.

FIG. 3 is a plan view which illustrates configurations of the image forming unit for the left eye 10A and the image display unit for the left eye 110A which configure the display device 100. In addition, FIG. 3 illustrates the left eye 310A of a user who wears the display device 100.

In addition, the image forming unit for the right eye 10B and the image display unit for the right eye 110B which are not illustrated in FIG. 3 have the same configurations as the image forming unit for the left eye 10A and the image display unit for the left eye 110A, and are arranged so as to be horizontally symmetric to the image forming unit for the left eye 10A and the image display unit for the left eye 110A.

The image display unit for the left eye 110A includes a reflecting unit for the left eye 30A, a light guiding unit for the left eye 20A, and a semi-transmissive reflecting unit for the left eye 21A. The image display unit for the right eye 110B (refer to FIG. 2) includes a reflecting unit for the right eye (not illustrated), a light guiding unit for the right eye (not illustrated), and a semi-transmissive reflecting unit for the right eye 21B (refer to FIG. 2).

The image forming unit for the left eye 10A includes an image generation unit for the left eye 11A, and a projection optical system for the left eye 12A. The image generation unit for the left eye 11A includes a backlight light source for the left eye 410A, and an optical modulation unit for the left eye 411A.

According to the embodiment, the backlight light source for the left eye 410A is configured as an aggregate of light sources of each luminous color such as red, green, and blue. As the light source, for example, it is possible to use a light emitting diode (LED), or the like.

As the optical conversion element for the left eye 411A, for example, it is possible to use a liquid crystal display device, or the like.

The projection optical system for the left eye 12A is configured of a lens group including a plurality of projection lenses which project image light which is input thereto.

The HMD 300 according to the embodiment will be schematically described with reference to FIGS. 2 and 3.

An image signal for the left eye is input to the image generation unit for the left eye 11A from the control device 200.

In the image generation unit for the left eye 11A, each LED light source of the backlight light source for the left eye 410A emits red light, green light, and blue light. The red light, green light, and blue light which are emitted from each LED light source of the backlight light source for the left eye 410A are input to the optical conversion element for the left eye 411A. The optical conversion element for the left eye 411A performs spatial modulation with respect to the red light, green light, and blue light according to the image signal which is input to the image generation unit for the left eye 11A from the control device 200, and emits image light corresponding to the image signal. The projection optical system for the left eye 12A emits image light which is emitted from the optical conversion element for the left eye 411A of the image generation unit for the left eye 11A as parallel light, and projects the light onto the reflecting unit for the left eye 21A. The image light which is projected onto the reflecting unit for the left eye 21A is reflected on the reflecting unit for the left eye 21A, and proceeds toward the light guiding unit for the left eye 20A.

The light guiding unit for the left eye 20A guides image light which is set as parallel light using the projection optical system for the left eye 12A to one semi-transmissive reflecting face of a triangular prism of the semi-transmissive reflecting unit for the left eye 21A. Reflective coating is performed on a semi-transmissive reflecting face which faces the left eye 310A side of a user when the user is wearing the HMD, among the semi-transmissive reflecting faces which are formed in the semi-transmissive reflecting unit for the left eye 21A. Image light which is projected onto the semi-transmissive reflecting face of the semi-transmissive reflecting unit for the left eye 21A is reflected toward the left eye 310A of the user due to the semi-transmissive reflecting face which is reflective coating. In this manner, an image corresponding to projected image light is generated in a predetermined region (image extracting region) of the semi-transmissive reflecting unit for the left eye 21A.

The image light which is transmitted using the light guiding unit for the left eye 20A is reflected on the semi-transmissive reflecting face of the semi-transmissive reflecting unit for the left eye 21A, the reflected light is input to the left eye 310A of the user, and a virtual image is formed on the retina of the left eye 310A. According to the embodiment, the image display unit for the left eye 110A which includes the reflecting unit for the left eye 30A, the light guiding unit for the left eye 20A, and the semi-transmissive reflecting unit for the left eye 21A are configured so as to move in the horizontal direction (direction of arrow H) in FIG. 3. For this reason, a relative position between the light guiding unit for the left eye 20A and projection optical system for the left eye 12A is changed; however, the light guiding unit for the left eye 20A can guide image light from the projection optical system for the left eye 12A to the light guiding unit for the left eye 20A through the reflecting unit for the left eye 30A in any position with respect to the projection optical system for the left eye 12A.

At least part of the light which is input to the semi-transmissive reflecting unit for the left eye 21A from the outside transmits the semi-transmissive reflecting face of the semi-transmissive reflecting unit for the left eye 21A, and is guided to the left eye 310A of a user. In this manner, the user is able to view an image which is formed using the image forming unit for the left eye 10A, and the outside image in a state of being overlapped with each other.

That is, the user is able to recognize an image corresponding to image light which is output from the image extracting region of the display device 100 (image extracting region of the semi-transmissive reflecting unit for the left eye 21A, and image extracting region of the semi-transmissive reflecting unit for the right eye 21B) by wearing the display device 100 on the head. In addition, the user is able to view the outside while wearing the display device 100 on the head, when at least part of light from the outside transmits the image extracting region of the display device 100 (image extracting region of the semi-transmissive reflecting unit for the left eye 21A, and the image extracting region of the semi-transmissive reflecting unit for the right eye 21B).

In this manner, the user is able to view an image as a display target of the display device 100 and the outside image at the same time. In addition, a user is able to input an operation order using the operation button unit 250 of the control device 200.

As illustrated in FIG. 2, the image forming unit for the left eye 10A includes a temple unit 122A on the left side of the display device 100 so as to be located on the left side of the head of a user when being worn. The image forming unit for the left eye 10A forms an image for the left eye of a user, and outputs the image for the left eye toward the image extracting region of the semi-transmissive reflecting unit for the left eye 21A. Similarly, the image forming unit for the right eye 10B includes a temple unit 122B on the right side of the display device 100 so as to be located on the right side of the head of the user when being worn. The image forming unit for the right eye 10B forms an image for the right eye of the user, and outputs the image for the right eye toward the image extracting region of the semi-transmissive reflecting unit for the right eye 21B.

Meanwhile, when the HMD 300 is used, it is necessary to align the center of the field of vision of the user and the position of each image by adjusting a position of the image display unit for the left eye 110A and a position of the image display unit for the right eye 110B, respectively. Therefore, the display device 100 according to the embodiment includes a position adjusting unit 140 which adjusts a gap between the image display unit for the left eye 110A and the image display unit for the right eye 110B, and can adjust a position of the image display unit for the left eye 110A with respect to the main frame 120, and a position of the image display unit for the right eye 110B with respect to the main frame 120, respectively and independently.

The position adjusting unit 140 adjusts the gap between the image display unit for the left eye 110A and the image display unit for the right eye 110B, and includes a connection member 131 which connects the image display unit for the left eye 110A and the image display unit for the right eye 110B, a left side elastic member 132A which is arranged between the main frame 120 and the image display unit for the left eye 110A, a right side elastic member 132B which is arranged between the main frame 120 and the image display unit for the right eye 110B, and an adjusting knob 133. The position adjusting unit 140 performs position adjusting of the image display unit for the left eye 110A and the image display unit for the right eye 110B in the extending direction (horizontal direction) of the rim unit 121. Accordingly, a separate adjustment is performed using an arbitrary method with respect to a direction which is perpendicular to the extending direction (vertical direction) of the rim unit 121. For example, the adjustment with respect to the vertical direction is performed using a nose pad which is provided in the main frame 120.

Hereinafter, a configuration of the position adjusting unit 140 according to the embodiment will be described using FIG. 4.

Figure 4:
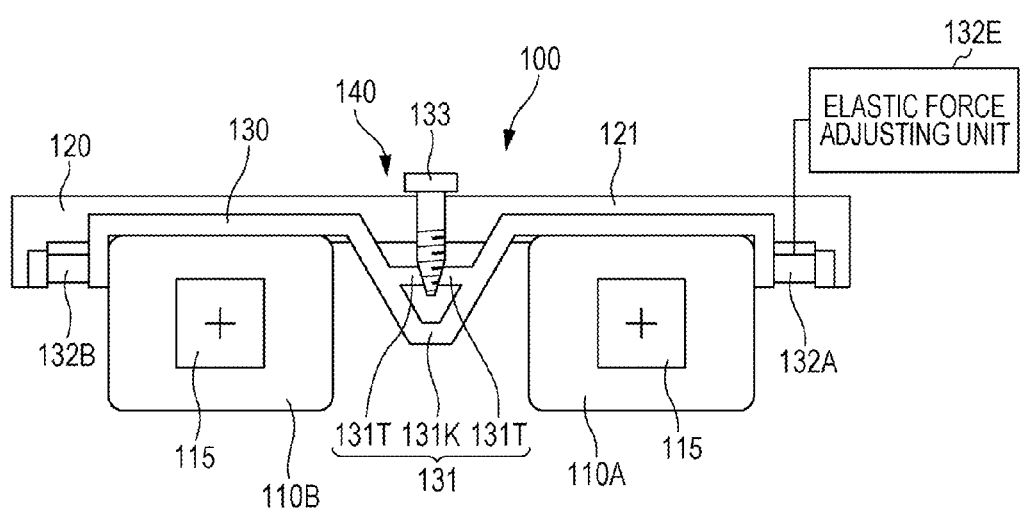
FIG. 4 is a front view of the image display apparatus according to the first embodiment.

FIG. 4 is a front view of the display device 100 according to the embodiment.

As described above, the image display unit for the left eye 110A and the image display unit for the right eye 110B are supported by the sub-frame 130. In addition, the sub-frame 130 is configured so as to slide in the longitudinal direction of the rim unit 121 with respect to the main frame 120.

The left side elastic member 132A according to the embodiment corresponds to a first elastic member in claims. The right side elastic member 132B according to the embodiment corresponds to a second elastic member in claims. The adjusting knob 133 according to the embodiment corresponds to an adjusting member in claims.

The connection member 131 is a member which connects the image display unit for the left eye 110A and the image display unit for the right eye 110B. In the embodiment, the connection member 131 is configured of an elastic material so as to change a gap between the image display unit for the left eye 110A and the image display unit for the right eye 110B. The connection member 131 includes a bent portion 131K in a V shape, and a pair of protrusion units 131T which faces each other. An elastic force of the connection member 131 works toward a direction in which one side and the other side of the bent portion 131K come closer to each other.

The adjusting knob 133 is provided so as to penetrate the main frame 120, and to come into contact with the pair of protrusion units 131T of the connection member 131. The adjusting knob 133 adjusts a deformation amount of the connection member 131. For example, when a user causes the adjusting knob 133 to descend by rotating the adjusting knob 133 in one direction, the connection member 131 is pressed and widened due to the adjusting knob 133, and the gap between the image display unit for the left eye 110A and the image display unit for the right eye 110B is widened. When a user causes the adjusting knob 133 to ascend by rotating the adjusting knob in the direction opposite to the former direction, the connection member 131 which is pressed and widened returns to the original state due to an elastic force, and the gap between the image display unit for the left eye 110A and the image display unit for the right eye 110B is narrowed.

The left side elastic member 132A is interposed between the main frame 120 and the image display unit for the left eye 110A. The left side elastic member 132A is elastically deformed in a direction in which the connection member 131 is compressed when being pressed and widened, and maintains a repulsive force which pushes the image display unit for the left eye 110A back to the connection member 131 side. When the connection member 131 which is pressed and widened due to an operation of the adjusting knob 133 returns to the original state, the left side elastic member 132A also returns to the original state.

Similarly, the right side elastic member 132B is interposed between the main frame 120 and the image display unit for the right eye 110B. The right side elastic member 132B is elastically deformed in a direction in which the connection member 131 is compressed when being pressed and widened, and maintains a repulsive force which pushes the image display unit for the right eye 110B back to the connection member 131 side. When the connection member 131 which is pressed and widened due to an operation of the adjusting knob 133 returns to the original state, the right side elastic member 132B also returns to the original state. In the left side elastic member 132A and the right side elastic member 132B, for example, it is possible to use an elastic member such as a resin elastomer, a coil spring, a flat spring, or the like.

In addition, at least one of an elastic force of the left side elastic member 132A and an elastic force of the right side elastic member 132B can be adjusted using the elastic force adjusting unit 132E. In this manner, it is possible to adjust the elastic force of the left side elastic member 132A, and the elastic force of the right side elastic member 132B so as to be different from each other. As a specific mechanism of the elastic force adjusting unit 132E, for example, it is possible to adopt a configuration in which a spacer, or the like, of which a size is different on the left side and the right side is inserted into the elastic member, or a configuration in which an amount of elastic deformation is changed by adjusting a fastening state of the left side elastic member 132A and the right side elastic member 132B using a screw, or the like. Alternatively, there is a configuration in which an elastic member such as a balloon which expresses an elastic force using an air pressure is used. In this case, it is possible to adjust the elastic force by changing an air pressure.

A seal 115 which is used when performing position adjusting of the image display unit for the left eye 110A is attached to the image display unit for the left eye 110A. At the center of the seal 115, a "+" mark as an index which denotes a display position of an image for the left eye is provided. That is, a position of the "+" mark matches the display position of the image for the left eye. Similarly, a seal 115 which is used when performing position adjusting of the image display unit for the right eye 110B is attached to the image display unit for the right eye 110B. At the center of the seal 115, a "+" mark as an index which denotes the display position of an image for the right eye is provided. That is, a position of the "+" mark matches the display position of the image for the right eye. The seal 115 is formed of a material which is transparent or translucent, and a portion of the "+" mark is opaque. In this manner, a user is able to view his own pupil through a mirror, or the like, even in a state in which the seal 115 is attached. In addition, the mark may be configured using a light transmission unit in which a peripheral portion thereof is translucent or opaque, and the center portion is transparent, in reverse to the opaque "+" mark. the shape of the mark is not limited to the "+", in particular.

The "seal 115" according to the embodiment corresponds to the "first index unit" and the "second index unit" in claims. The "+" mark according to the embodiment corresponds to the "first index" and the "second index" in claims.

Figure 5:
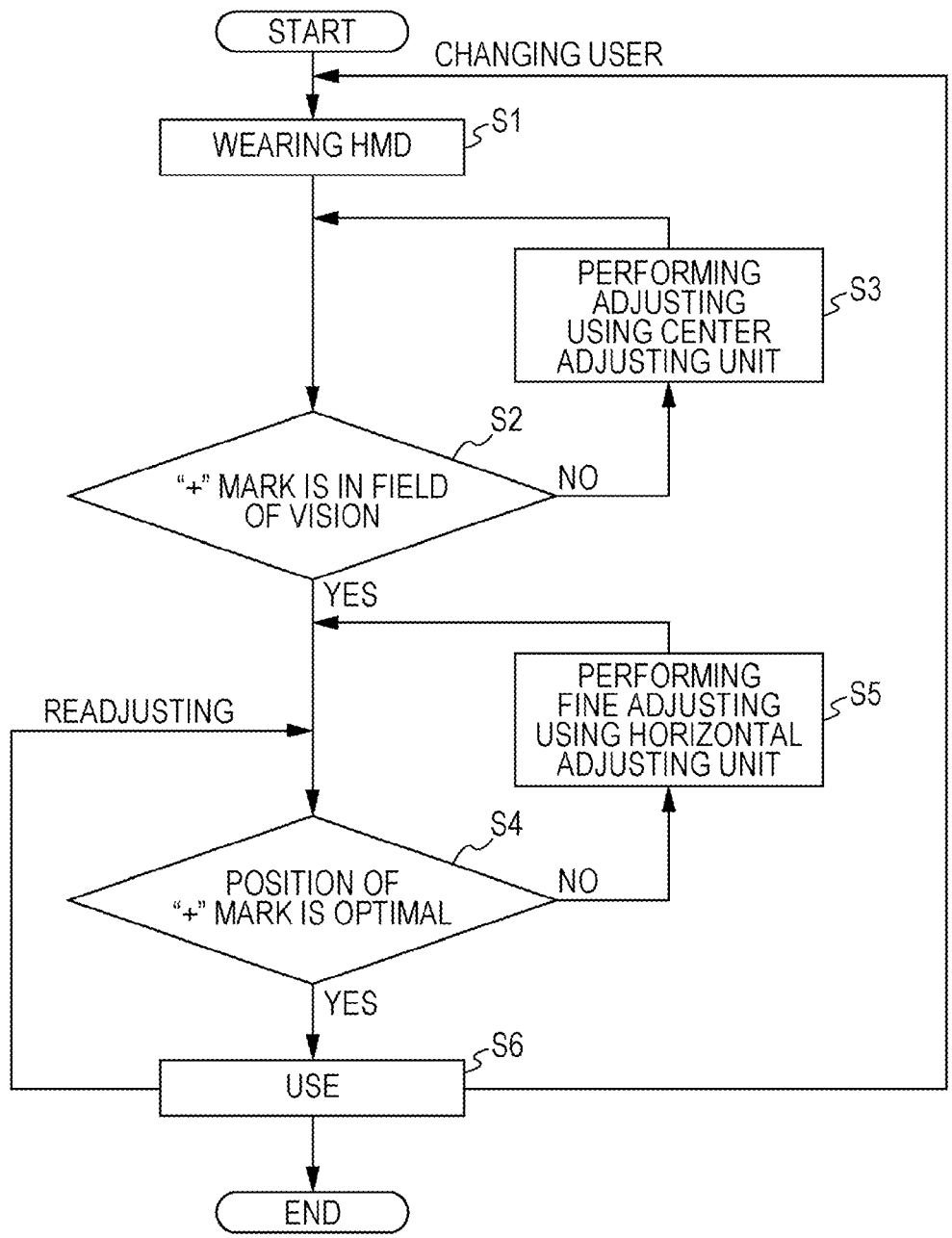
FIG. 5 is a flowchart which illustrates a procedure of a position adjusting operation of the image display unit.

Hereinafter, as a method of performing position adjusting of each of the image display unit for the left eye 110A and the image display unit for the right eye 110B will be described using the flowchart in FIG. 5.

It is necessary to perform position adjusting of each of the image display unit for the left eye 110A and the image display unit for the right eye 110B when a user first uses the HMD 300, a user or a usage environment is changed, or the like. At this time, the position adjusting may be performed using an actual image; however, it is difficult to perform position adjusting using the actual image when position adjusting is started in a state in which an image is not in the field of vision of the user, a fine adjustment is desired to be performed, or the like. Therefore, position adjusting is performed using the "+" mark of the seal 115 which is attached to each of the image display unit for the left eye 110A and the image display unit for the right eye 110B, instead of the actual image. That is, a user performs position alignment of the center of a pupil and the "+" mark while viewing an observation device such as a mirror, a camera, or the like.

First, a user wears the HMD 300 (step S1).

Subsequently, the user determines whether or not the "+" mark is in his field of vision (step S2).

When the "+" mark is not in the field of vision (No in step S2), a gap between the image display unit for the left eye 110A and the image display unit for the right eye 110B is adjusted using the adjusting knob 133 at the center of the sub-frame 130 (step S3).

When the "+" mark is in the field of vision (Yes in step S2), a user checks whether or not a position of the "+" mark in the field of vision is optimal, that is, whether or not the position of the "+" mark matches the center of the pupil (step S4).

When the position of the "+" mark does not match the center of the pupil (No in step S4), each position of the image display unit for the left eye 110A and the image display unit for the right eye 110B is subjected to a fine adjustment individually (step S5). Specifically, the elastic force of the left side elastic member 132A, and the elastic force of the right side elastic member 132B are subjected to a fine adjustment by adjusting a mechanical fastening state or an air pressure.

When the position of the "+" mark matches the center of the pupil (Yes in step S4), the position adjusting operation of each of the image display unit for the left eye 110A and the image display unit for the right eye 110B is completed, an actual image is displayed, and usage thereof is started (step S6). Thereafter, for example, when a user is changed, or the like, the procedure is repeated from step S1.

In the HMD 300 according to the embodiment, it is possible to adjust the gap between the image display unit for the left eye 110A and the image display unit for the right eye 110B using the position adjusting unit 140, and to adjust the respective position of the image display unit for the left eye 110A with respect to the main frame 120, and the position of the image display unit for the right eye 110B with respect to the main frame 120, independently. In this manner, it is possible for a user to easily perform the position adjusting operation of each of the image display units 110A and 110B. Since the HMD 300 according to the embodiment is a see-through-type (transmission type) image display apparatus, a user is able to perform the position adjusting operation of each of the image display units 110A and 110B, when a user aligns the "+" mark at the center of the pupil using an external device such as a camera which can photograph himself, a mirror, or the like.

Modification Example

As a unit which can perform individual position adjusting of each image display unit, a left side elastic member and a right side elastic member of which the elastic moduli are different may be used, instead of a configuration in which an elastic force of the left side elastic member 132A, and an elastic force of the right side elastic member 132B can be adjusted. In this case, even when an equal external force is applied to the image display unit for the left eye 110A and the image display unit for the right eye 110B, amounts of movement of the image display unit for the left eye 110A and the image display unit for the right eye 110B become different. For this reason, when the adjusting knob 133 at the center is operated, the gap between the image display unit for the left eye 110A and the image display unit for the right eye 110B is changed, and at the same time, positions of the individual image display unit for the left eye 110A and the image display unit for the right eye 110B are changed. In this case, adjusting of a gap between image display units, and position adjusting of an individual image display unit are performed at the same time, and it is not possible to perform these individually and independently. However, even in such a configuration, it is possible for a user to perform both of the adjustments easily.

Second Embodiment

Hereinafter, a second embodiment of the invention will be described using FIG. 6.

A basic configuration of an HMD according to the embodiment is the same as that in the first embodiment, and a configuration of a position adjusting unit is different from that in the first embodiment.

Figure 6:
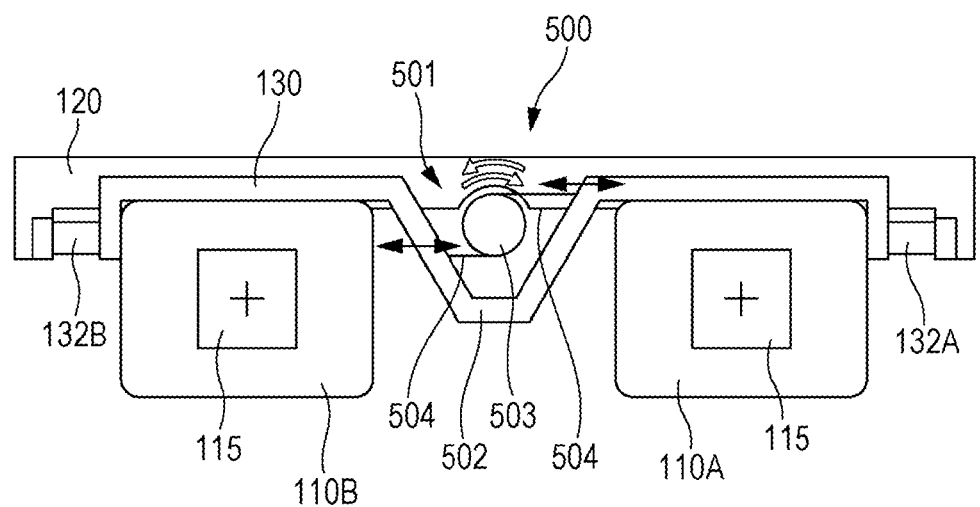
FIG. 6 is a front view of an image display apparatus according to a second embodiment.

FIG. 6 is a front view of a display device according to the embodiment.

In FIG. 6, common constituent elements with those in FIG. 4 which are used in the first embodiment will be given the same reference numerals, and detailed descriptions thereof will be omitted.

As illustrated in FIG. 6, a display device 500 according to the embodiment includes a position adjusting unit 501, a connection member 502, an adjusting knob 503, and a linear member 504. The adjusting knob 503 and the linear member 504 are units for adjusting a gap between an image display unit for the left eye 110A and an image display unit for the right eye 110B. The adjusting knob 503 is set so as to rotate in a plane which is parallel to display faces of the image display unit for the left eye 110A and the image display unit for the right eye 110B. The linear member 504 is wound around the adjusting knob 503. In addition, an elastic force of the connection member 502 pushes toward a direction in which one side and the other side of a bent portion 502K move far from each other. Other configurations than that are the same as those in the first embodiment.

When the adjusting knob 503 is rotated in one direction, for example, clockwise, the linear member 504 is wound around the adjusting knob 503, and the connection member 502 is pulled to the inside by the linear member 504. As a result, a gap between the image display unit for the left eye 110A and the image display unit for the right eye 110B is narrowed. In addition, when the adjusting knob 503 is rotated in the opposite direction, for example, counterclockwise, the linear member 504 is pulled away from the adjusting knob 503, and the connection member 502 is restored to the original state thereof due to an elastic force. As a result, the gap between the image display unit for the left eye 110A and the image display unit for the right eye 110B is widened.

Also in the display device 500 according to the embodiment, it is possible to obtain the same effect as that in the first embodiment, that is, it is possible for a user to easily perform a position adjusting operation of the image display unit.

Third Embodiment

Hereinafter, a third embodiment of the invention will be described using FIG. 7.

A basic configuration of an HMD according to the embodiment is the same as that in the first embodiment, and a configuration of a position adjusting unit is different from that in the first embodiment.

Figure 7:
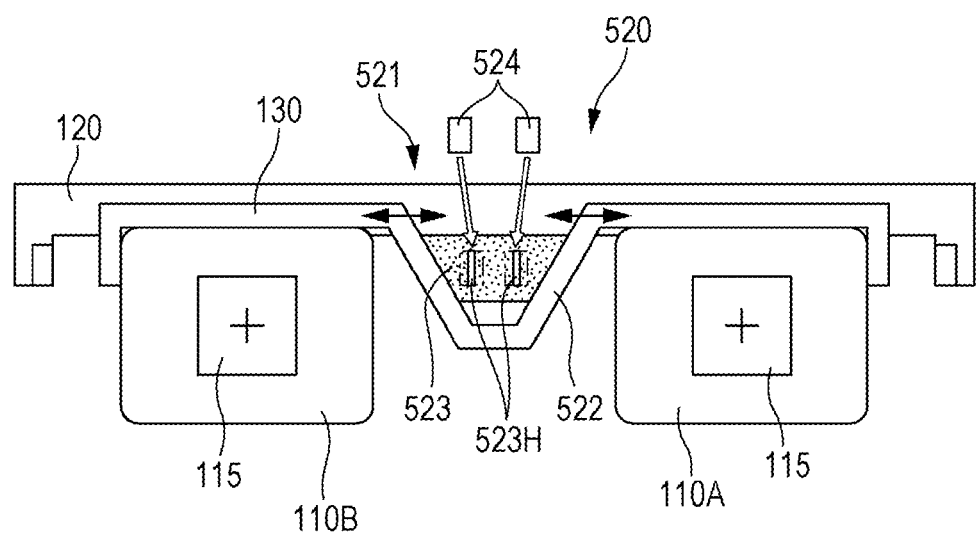
FIG. 7 is a front view of an image display apparatus according to a third embodiment.

FIG. 7 is a front view of a display device according to the embodiment.

In FIG. 7, the same reference numerals are given to common constituent elements in FIG. 4 used in the first embodiment, and detailed descriptions thereof will be omitted.

As illustrated in FIG. 7, in the display device 520 according to the embodiment, a position adjusting unit 521 includes a connection member 522, an elastic member 523, and a spacer 524. The elastic member 523 and the spacer 524 are units for performing adjusting of a gap between an image display unit for the left eye 110A and an image display unit for the right eye 110B, and performing individual position adjusting of the image display unit for the left eye 110A and the image display unit for the right eye 110B. The elastic member 523 is configured of, for example, a resin elastomer. Holes 523H into which the spacer 524 can be inserted are provided on the left side and the right side, respectively, with respect to the center of the elastic member 523. A center position of the elastic member 523 is fixed to a main frame 120. An elastic force of the elastic member 523 pushes toward a direction in which one side and the other side of the connection member 522 come closer to each other. In the case of the embodiment, a left side elastic member and a right side elastic member are not provided. Other configurations than that are the same as those in the first embodiment.

When a user inserts the spacer 524 into a left hole 523H of the elastic member 523, the elastic member 523 is pressed and widened using the spacer 524, and a gap between the image display unit for the left eye 110A and the image display unit for the right eye 110B is widened. At the same time, since the center of the elastic member 523 is fixed to a main frame 120, a pressing force of the elastic member 523 on the left portion which presses the image display unit for the left eye 110A becomes stronger than a force pressing the image display unit for the right eye 110B, and the image display unit for the left eye 110A greatly moves with respect to the main frame 120.

In contrast to this, when a user inserts the spacer 524 into a right hole 523H of the elastic member 523, the gap between the image display unit for the left eye 110A and the image display unit for the right eye 110B is widened, and at the same time, the image display unit for the right eye 110B greatly moves with respect to the main frame 120. In both cases, when the inserted spacer 524 is detached, the image display unit for the left eye 110A and the image display unit for the right eye 110B return to the original positions thereof due to an elastic force of the elastic member 523. It is also possible to adjust a movement amount of the image display unit for the left eye 110A or the image display unit for the right eye 110B by changing the size of the spacer 524 to be inserted.

Also in the display device 520 according to the embodiment, it is possible to obtain the same effects as those in the first and second embodiments, that is, it is possible for a user to easily perform a position adjusting operation of the image display unit.

Fourth Embodiment

Hereinafter, a fourth embodiment of the invention will be described using FIG. 8.

A basic configuration of an HMD according to the embodiment is the same as that in the first embodiment, and a configuration of a position adjusting unit is different from that in the first embodiment.

Figure 8:
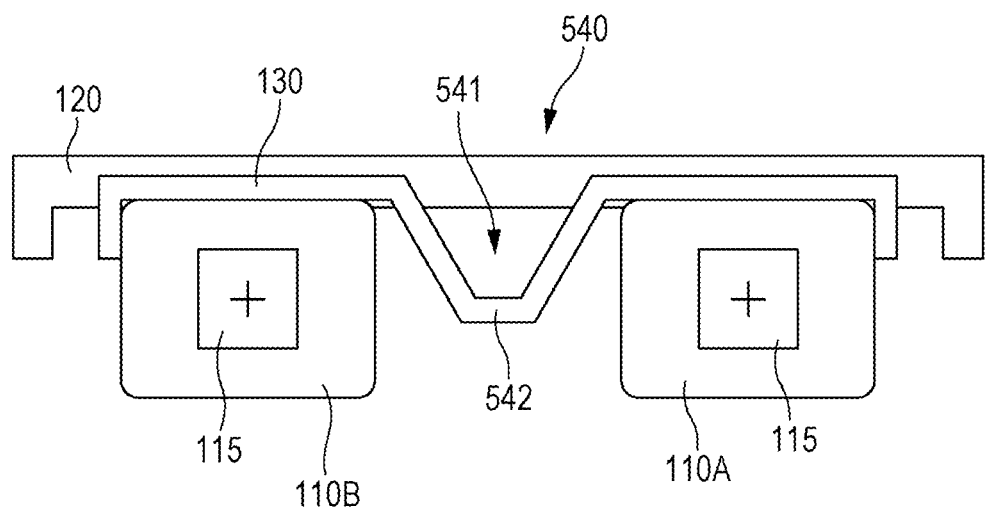
FIG. 8 is a front view of an image display apparatus according to a fourth embodiment.

FIG. 8 is a front view of a display device according to the embodiment.

In FIG. 8, the same reference numerals are given to common constituent elements in FIG. 4 which are used in the first embodiment, and detailed descriptions thereof will be omitted.

As illustrated in FIG. 8, in a display device 540 according to the embodiment, a position adjusting unit 541 includes a connection member 542 which is formed of an material having ultrahigh elasticity. The connection member 542 is a unit for performing adjusting of a gap between an image display unit for the left eye 110A and an image display unit for the right eye 110B, and for performing individual position adjusting of the image display unit for the left eye 110A and the image display unit for the right eye 110B. A center position of the connection member 542 is fixed to a main frame 120. In the embodiment, a left side elastic member and a right side elastic member are not provided. Other configurations than that are the same as those in the first embodiment.

It is possible for a user to freely deform the connection member 542 using an arbitrary adjusting tool or a hand, adjust a gap between an image display unit for the left eye 110A and an image display unit for the right eye 110B, and to adjust individual position of the image display unit for the left eye 110A and the image display unit for the right eye 110B. As the adjusting tool, it is preferable to use, for example, a tool which can gradually change a deformation amount of the connection member 542, or a tool which can continuously change the deformation amount of the connection member 542, and the tool may be detached therefrom when the adjusting work is finished.

Also in the display device 540 according to the embodiment, it is possible to obtain the same effects as those in the first to third embodiments, that is, it is possible for a user to easily perform a position adjusting operation of the image display unit.

Fifth Embodiment

Hereinafter, a fifth embodiment of the invention will be described using FIG. 9.

A basic configuration of an HMD according to the embodiment is the same as that in the first embodiment, and a configuration of an index unit is different from that in the first embodiment.

Figure 9:
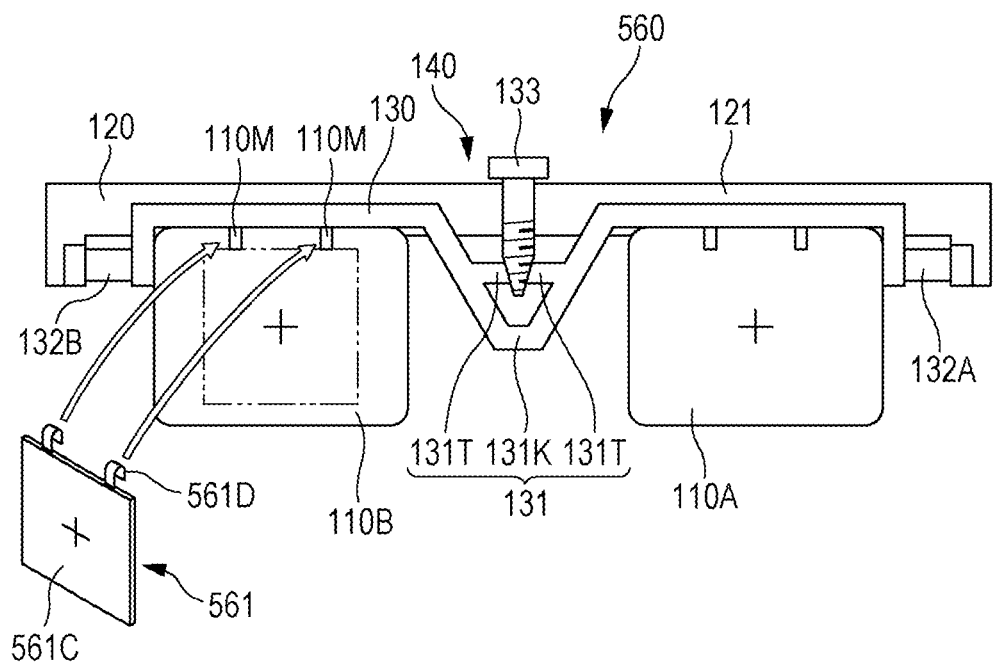
FIG. 9 is a front view of an image display apparatus according to a fifth embodiment.

FIG. 9 is a front view of a display device according to the embodiment.

In FIG. 9, the same reference numerals are given to common constituent elements in FIG. 4 which are used in the first embodiment, and detailed descriptions thereof will be omitted.

In the first embodiment, a configuration in which a seal including the "+" mark is attached to the image display unit as an index unit is adopted. As illustrated in FIG. 9, in a display device 560 according to the embodiment, a detachable marker 561 including a "+" mark as an index for denoting a display position of an image is provided, instead of the configuration. The detachable marker 561 includes a marker main body 561C including the "+" mark, and a convex portion for engagement 561D. The convex portion for engagement 561D is provided at two portions on the higher side of the marker main body 561C. Concave portions for engagement 110M are provided at positions corresponding to the convex portion for engagements 561D in each of an image display unit for the left eye 110A and an image display unit for the right eye 110B. By fitting the convex portion for engagement 561D into the concave portion for engagement 110M, it is possible to attach the detachable marker 561 at a predetermined position of both the image display unit for the left eye 110A and the image display unit for the right eye 110B. Other configurations than that are the same as those in the first embodiment.

The detachable marker 561 according to the embodiment corresponds to the first index unit and the second index unit in claims. The convex portion for engagements 561D according to the embodiment corresponds to the first attaching-detaching unit in claims.

Also in the display device 560 according to the embodiment, it is possible to obtain the same effects as those in the first to fourth embodiments, that is, it is possible for a user to easily perform a position adjusting operation of the image display unit.

In particular, according to the embodiment, when attaching the detachable marker 561 to the image display units 110A and 110B, it is possible to accurately attach the detachable marker 561 so as to conform with an image display position of each of the image display unit for the left eye 110A and the image display unit for the right eye 110B, by fitting the convex portion for engagement 561D into the concave portion for engagement 110M. For this reason, even when the position adjusting operation of the image display units 110A and 110B is repeated a plurality of times, it is possible to precisely perform the position adjusting.

Sixth Embodiment

Hereinafter, a sixth embodiment of the invention will be described using FIG. 10.

A basic configuration of an HMD according to the embodiment is the same as that in the first embodiment, and a configuration of an index unit is different from that in the first embodiment.

Figure 10:
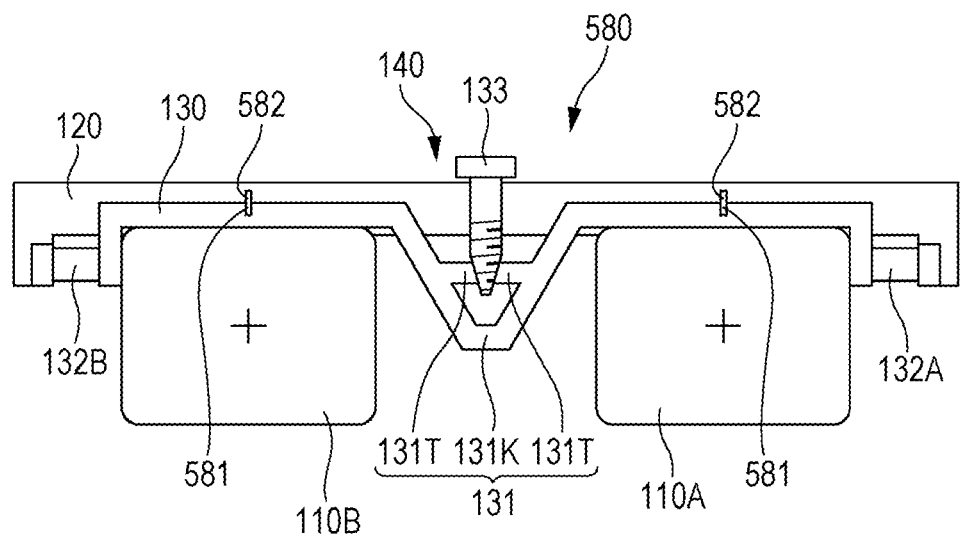
FIG. 10 is a front view of an image display apparatus according to a sixth embodiment.

FIG. 10 is a front view of a display device according to the embodiment.

In FIG. 10, the same reference numerals are given to common constituent elements in FIG. 4 which are used in the first embodiment, and detailed descriptions thereof will be omitted.

As illustrated in FIG. 10, a display device 580 according to the embodiment includes a fixing marker 581 which is an index denoting a display position of an image. The fixing marker 581 is printed as a vertical line at a position corresponding to the center of an image on a sub-frame 130. In this manner, it is necessary for the fixing marker 581 to be located at a position which can be viewed using a mirror, an external device, or the like; however, it is preferable to be provided so as not to attract much attention. When an optical system in which a user does not focus on the fixing marker 581 using the eyes is used, the user does not feel a sense of unease. To achieve such an effect, for example, it is effective when printing of the fixing marker 581 is performed using a light color, and a fixing marker 581 which reacts only to a specific wavelength is used when being viewed using an external device, or the like.

In FIG. 10, a fixing marker 582 is also provided in the main frame 120; however, the fixing marker 582 on the main frame 120 side is for denoting a rough position of an image, and is not essential. Here, an example of a fixing marker in a movement direction (horizontal direction) of each of the image display units 110A and 110B is illustrated; further, a fixing marker in a direction vertical to a movement direction (vertical direction) of each of the image display units 110A and 110B is illustrated and may be provided. Other configurations than that are the same as those in the first embodiment.

Also in the display device 580 according to the embodiment, it is possible to obtain the same effects as those in the first to fifth embodiments, that is, it is possible for a user to easily perform a position adjusting operation of the image display unit.

Seventh Embodiment

Hereinafter, a seventh embodiment of the invention will be described using FIGS. 11 and 12.

A basic configuration of an HMD according to the embodiment is the same as that in the first embodiment, and the position adjusting method is different from that in the first embodiment.

Figure 11:
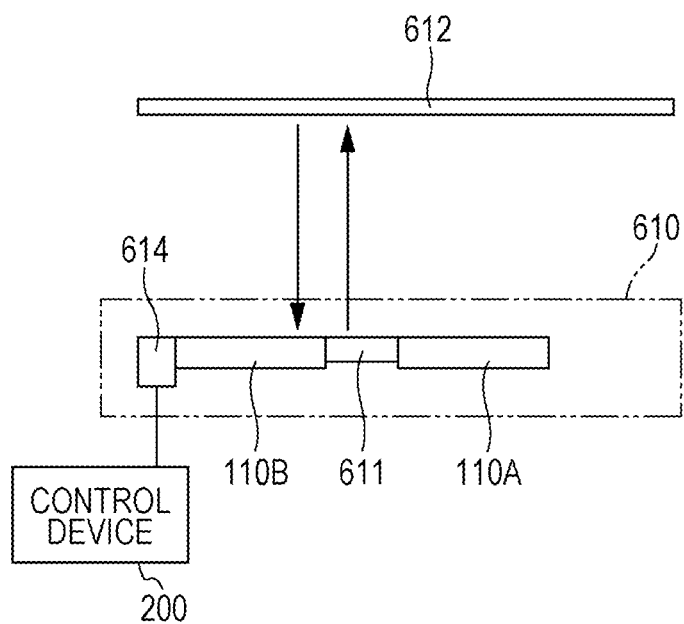
FIG. 11 is a plan view of an image display apparatus according to a seventh embodiment.

FIG. 11 is a plan view of a display device according to the embodiment.

FIG. 12 is a flowchart which illustrates a procedure of a position adjusting operation of an image display unit.

As illustrated in FIG. 11, in a display device 610 according to the embodiment, as an index unit which is used when adjusting a position of each of image display units 110A and 110B using a position adjusting unit 611, the index which is exemplified in the above described embodiments, for example, pattern paper for adjusting 612 with an index which is formed of a "+" mark, is used. In addition, the display device 610 includes a camera 614 which photographs the front side of a user. When performing position adjusting of each of the image display units 110A and 110B, the camera 614 captures an index of the pattern paper for adjusting 612 which is reflected in a mirror and a center position of a pupil, and transmits a photographed result thereof to the control device 200.

Hereinafter, the method of position adjusting of each of image display units 110A and 110B will be described using the flowchart in FIG. 12. In addition, a configuration of the position adjusting unit 611 is the same as that of the position adjusting unit in the first embodiment.

First, a user wears an HMD (step S1).

Subsequently, the user sets the pattern paper for adjusting 612 at a designated position according to an instruction using a sound, or the like, from the control device 200 (step S2).

Subsequently, the user adjusts a gap between each of the image display units 110A and 110B so that the index of the pattern paper for adjusting 612 is viewed according to the instruction using a sound, or the like, from the control device 200 (step S3).

Subsequently, the user determines whether or not the index is in a field of vision (step S4).

When the index is not in the field of vision of the user (No in step S4), the gap between each of the image display units 110A and 110B is readjusted (step S3).

When the index is in the field of vision of the user (Yes in step S4), each of image display units 110A and 110B display images used for adjusting. The image for adjusting may be a mark in an arbitrary shape, similarly to the index of the pattern paper for adjusting 612. The user performs fine adjusting of positions of each of the image display units 110A and 110B so that a position of the image for adjusting in the field of vision is optimal, that is, a position of the image for adjusting and the center of a pupil match with each other according to the instruction using a sound, an image, or the like, from the control device 200 (step S5).

Subsequently, the user determines whether or not the position of the image for adjusting in the field of vision is optimal (step S6).

When the position of the image for adjusting in the field of vision is optimal (Yes in step S6), the position adjusting operation of each of the image display units 110A and 110B is finished.

When the position of the image for adjusting in the field of vision is not optimal (No in step S6), positions of each of the image display units 110A and 110B are subjected to fine adjusting again (step S5).

Also in the display device 610 according to the embodiment, it is possible to obtain the same effects as those in the first to sixth embodiments, that is, it is possible for a user to easily perform a position adjusting operation of the image display unit.

In particular, according to the embodiment, since an instruction using sound, or the like, from the control device 200 is given, the user is able to perform the position adjusting operation of the image display unit well.

Eighth Embodiment

Hereinafter, an eighth embodiment will be described using FIG. 13.

A basic configuration of an HMD according to the embodiment is the same as that in the first embodiment, and a position adjusting method is different from that in the first embodiment.

FIG. 13 is a plan view of a display device according to the embodiment.

As illustrated in FIG. 13, a display device 630 according to the embodiment includes a camera 634 which photographs the front side of a user, similarly to the display device 610 in the seventh embodiment. The display device 630 may include an index unit (not illustrated) such as a seal including an index of a center position of an image, and a marker. Alternatively, the display device 630 may display an index which is formed of an actual image due to a command from the control device 200.

The control device 200 includes a detection unit 205 which detects information related to a deviation direction and a deviation amount between a position of an index and a center position of a pupil, a display unit 210 (output unit) which outputs the information detected by the detection unit 205, and a storage unit 215 based on an imaging result of the camera 634. A program for adjusting that gives an instruction related to position adjusting of each of the image display units 110A and 110B to a user is stored in the storage unit 215.

When performing position adjusting of each of the image display units 110A and 110B, the camera 634 photographs the state of a user which is reflected in a mirror 635, and transmits the photographed image to the control device 200. At this time, the program for adjusting in the control device 200 is started up, an instruction such as an operation direction of the position adjusting unit 631 is given to a user using sound or an image, and the instruction is continuously given until a position of each of the image display units 110A and 110B is settled at an appropriate position. Specifically, for example, the control device 200 outputs a signal for position adjusting to the display device 630. The detection unit 205 of the control device 200 calculates a deviation direction and a deviation amount between the center of a pupil of a user and an index from an image which is reflected in the mirror 635, and gives an instruction related to a rotation direction, a rotation amount, or the like, of the adjusting knob to a user through a display using the display unit 210, sound, or the like.

Also in the display device 630 according to the embodiment, it is possible to obtain the same effects as those in the first to seventh embodiments, that is, it is possible for a user to easily perform a position adjusting operation of the image display unit.

In particular, according to the embodiment, since an instruction related to the rotation direction, the rotation amount, or the like, of the adjusting knob is given to a user through the control device 200, for example, the position adjusting operation becomes simpler.

Ninth Embodiment

Hereinafter, a ninth embodiment of the invention will be described using FIG. 14.

A basic configuration of an HMD according to the embodiment is the same as that in the first embodiment, and a position adjusting method is different from that in the first embodiment.

FIG. 14 is a plan view of a display device according to the embodiment.

As illustrated in FIG. 14, a configuration of a display device 100 according to the embodiment is the same as that of the display device according to the first embodiment. The display device 100 may include an index unit (not illustrated) such as a seal including an index of a center position of an image, and a marker, or may display an index using an actual image. Meanwhile, a program for adjusting for giving an instruction related to position adjusting of each of the image display units 110A and 110B is stored in an external device 650. As the external device 650, for example, a smart phone including a camera 654 in which an exclusive application for position adjusting of the image display unit is downloaded, or the like, is used.

When performing position adjusting of each of the image display units 110A and 110B, the camera 654 of the external device 650 detects a deviation between a center of a pupil of a user and a position of an image, and gives an instruction related to a rotation direction, a rotation amount, or the like, of an adjusting knob, for example, to a user using a display or a sound.

Also in the display device according to the embodiment, it is possible to obtain the same effects as those in the first to eighth embodiments, that is, it is possible for a user to easily perform a position adjusting operation of the image display unit.

In addition, a technical range of the invention is not limited to the above described embodiments, and various modifications can be added thereto without departing from the scope of the invention.

For example, in the above described embodiments, the position adjusting unit is set to perform position adjusting of the image display unit in the extending direction of the rim unit (horizontal direction), and the image display unit is separately adjusted using an arbitrary method in a direction perpendicular to the extending direction of the rim unit (vertical direction). The position adjusting unit may perform position adjusting of the image display unit in both the horizontal direction and the vertical direction, instead of the configuration.

The invention is not limited to the see-through-type (transmission type) HMD 300, and may be applied to an immersive HMD 300. In such a case, since it is not possible for a user to perform a position adjusting operation using a mirror, a position adjusting operation may be performed using an actual image as an index.

In addition to that, a specific configuration of each unit of the image display apparatus is not limited to the above described embodiments, and can be appropriately modified.

The entire disclosure of Japanese Patent Application No. 2014-095731, filed May 7, 2014 is expressly incorporated by reference herein.

What is claimed is:

1. An image display apparatus comprising:
   a first image display unit;
   a second image display unit;
   a support member which support the first image display unit and the second image display unit; and
   a position adjusting unit which adjusts positions of the first image display unit and the second image display unit,
   wherein the position adjusting unit adjusts a gap between the first image display unit and the second image display unit, and adjusts the position of the first image display unit with respect to the support member, and the position of the second image display unit with respect to the support member, respectively and independently.

2. The image display apparatus according to claim 1, wherein the position adjusting unit includes
   a connection member which adjusts a gap between the first image display unit and the second image display unit, and connects the first image display unit and the second image display unit;
   a first elastic member which is arranged between the support member and the first image display unit, and is formed of an elastic material; and
   a second elastic member which is arranged between the support member and the second image display unit, and is formed of an elastic material.

3. The image display apparatus according to claim 2, wherein the connection member is configured of an elastic material.

4. The image display apparatus according to claim 2, further comprising:
   a deformation adjusting member which adjusts a deformation amount of the connection member.

5. The image display apparatus according to claim 2, wherein an elastic modulus of the first elastic member is an elastic modulus which is different from that of the second elastic member.

6. The image display apparatus according to claim 2, further comprising:
   an elastic force adjusting unit which adjusts at least one of an elastic force of the first elastic member and an elastic force of the second elastic member.

7. The image display apparatus according to claim 1, wherein the first image display unit and the second image display unit are see-through-type display units respectively each of which displays image light and natural light in an overlapping manner.

8. The image display apparatus according to claim 1, further comprising:
   a first index unit which has a first index denoting an image position in the first image display unit; and
   a second index unit which has a second index denoting an image position in the second image display unit.

9. The image display apparatus according to claim 8, wherein the first index unit is connected to the first image display unit in an overlapping manner through a first attaching-detaching unit, and
   wherein the second index unit is connected to the second image display unit in an overlapping manner through the first attaching-detaching unit.

10. The image display apparatus according to claim 8, further comprising:
- an imaging unit which images the first index, the second index, and a pupil;
- a detection unit which detects information on a deviation direction and a deviation amount in positions of the first index and the pupil, and information regarding a deviation direction and a deviation amount in positions of the second index and the pupil based on an imaging result of the imaging unit; and
- an output unit which outputs the information which is detected using the detection unit.

11. The image display apparatus according to claim 8, further comprising:
- a reception unit which receives information on a deviation direction and a deviation amount in positions of the first index and a pupil, and information regarding a deviation direction and a deviation amount in positions of the second index and the pupil which are transmitted from an external device; and
- an output unit which outputs the information received by the reception unit.

12. The image display apparatus according to claim 1, wherein:
- the first display unit is configured to be positioned in front of a first eye of a user; and
- the second image display unit is configured to be positioned in front of a second eye of the user.

* * * * *